(12) United States Patent
Gnanadason et al.

(10) Patent No.: US 9,361,140 B1
(45) Date of Patent: Jun. 7, 2016

(54) ISOLATING APPLICATIONS IN SERVER ENVIRONMENT

(71) Applicant: International Business Machines Corporation, Armonk, NY (US)

(72) Inventors: Nihilson Gnanadason, Chennai (IN); Jayaprakash Rajasekaran, Chennai (IN); Frederick W. Rowe, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/567,132

(22) Filed: Dec. 11, 2014

(51) Int. Cl.
*G06F 9/46* (2006.01)
*G06F 9/455* (2006.01)
*G06F 9/50* (2006.01)

(52) U.S. Cl.
CPC .......... *G06F 9/45529* (2013.01); *G06F 9/4552* (2013.01); *G06F 9/5016* (2013.01); *G06F 2209/5022* (2013.01)

(58) Field of Classification Search
CPC .................................................. G06F 9/45529
USPC ..................................................... 718/1–108
See application file for complete search history.

(56) References Cited

U.S. PATENT DOCUMENTS

| 7,127,713 | B2 | 10/2006 | Davis et al. |
| 7,793,304 | B2 | 9/2010 | Schank et al. |
| 8,341,631 | B2 | 12/2012 | Havemose |
| 8,397,111 | B2 | 3/2013 | Hogstrom et al. |
| 8,510,728 | B2 | 8/2013 | Burckart et al. |
| 2006/0253507 | A1* | 11/2006 | Schank ................. H04L 67/125 |
| 2009/0037687 | A1* | 2/2009 | Li .......................... G06F 11/366 711/173 |
| 2011/0264841 | A1* | 10/2011 | Duimovich .......... G06F 9/44521 711/6 |
| 2013/0263127 | A1* | 10/2013 | y Arcas ................... G06F 9/455 718/1 |
| 2014/0137131 | A1 | 5/2014 | Dheap et al. |
| 2014/0173592 | A1* | 6/2014 | y Arcas ..................... G06F 9/54 718/1 |

OTHER PUBLICATIONS

Gama, Kiev, and Didier Donsez. "Towards dynamic component isolation in a service oriented platform." Component-Based Software Engineering. Springer Berlin Heidelberg, 2009. pp. 104-120.*
Jordan, Mick, et al. "Extending a J2EE™ server with dynamic and flexible resource management." Proceedings of the 5th ACM/IFIP/USENIX international conference on Middleware. Springer-Verlag New York, Inc., 2004, pp. 439-458.*
Jordan, Mick, et al. "Scaling J2EE™ application servers with the Multi-tasking Virtual Machine." (2004), pp. 1-19.*
Liu et al., "Partition-based Heap Memory Management in an Application Server", ACM SIGOPS Operating Systems Review, vol. 42, Issue 1, Jan. 2008, p. 98.

(Continued)

*Primary Examiner* — Satish Rampuria
(74) *Attorney, Agent, or Firm* — Reza Sarbakhsh; Parashos Kalaitzis

(57) ABSTRACT

Managing memory allocation for application deployment on a J2EE® server. The server receives applications for processing. The server also receives defined memory boundaries of the application. A custom memory-aware classloader is generated on the server and tracks memory allocated to the application during application processing. Excess memory usage characteristic of the application is detected, and an out of memory exception is thrown, without affecting other applications on the server. A responsive action is taken without affecting other applications processed by the server.

11 Claims, 6 Drawing Sheets

(56) References Cited

OTHER PUBLICATIONS

Back et al., "Processes in KaffeOS: Isolation, Resource Management, and Sharing in Java", Proceeding OSDI'00 Proceedings of the 4th Conference on Symposium on Operating System Design & Implementation, vol. 4, 2000, pp. 14.
Harbach, "CICS JVM Server Application Isolation", Master Thesis, Mar. 30, 2012, pp. 1-98.
Johnson, "Introduction to Java multitenancy", IBM developerWorks, Learn about a new feature for cloud systems in the IBM SDK Java Technology Edition, Version 7, Release 1, May 12, 2014, (First published Sep. 17, 2013), pp. 1-8.
Czajkowski, "Application Isolation in the JavaTM Virtual Machine", Proceeding OOPSLA '00, Proceedings of the 15th ACM SIGPLAN conference on Object-oriented programming, systems, languages, and applications, vol. 35 Issue 10, Oct. 2000, pp. 354-366.
Geoffray et al., "I-JVM: a Java Virtual Machine for Component Isolation in OSGi", Research Report, Jan. 20, 2009, pp. 10.
Mell et al., "The NIST Definition of Cloud Computing", Version 15, Oct. 7, 2009, National Institute of Standards and Technology, Information Technology Laboratory, pp. 2.

* cited by examiner

ISOLATING APPLICATIONS IN SERVER ENVIRONMENT

FIELD OF THE INVENTION

The present disclosure generally relates to computer systems, and more particularly to application management on a server.

BACKGROUND

Current Java® 2 Platform, Enterprise Edition (J2EE®) servers are designed to host multiple independent application units ("applications"). One expected benefit of such a managed environment is the application isolation it can provide, such that resource problems (like unexpected excessive memory usage) in one application does not affect other deployed applications. All trademarks and trade names are properties of their respective owners.

BRIEF SUMMARY

A limitation of the prior art is that there exists no isolation of Java heap usage between applications in J2EE® servers. Management of the Java Virtual Machine (JVM®) heap memory is currently configured indirectly for an entire server by manipulating the JVM via command line arguments at server startup time. Thus neither J2EE® Container(s) nor the JVM® is aware of memory requirements of individual application units running on the server, and the server is unable to control when a memory-leak-prone application's memory consumption continues to increase. Since all applications running on the server share this JVM-level allocated memory space, a large spike in memory utilization in one application may immediately impact all other applications and the server runtime itself. In many cases, the entire container enters a state of limbo and restarting the server is the only recovery mechanism.

Although there are multi-tenant (MT) JVMs® which allow the specification of Java® heap (and other parameter) limits, this capability is limited for at least that reason that it does not address the following JEE® application server issue: while current MT JVMs allow specification of the heap and other parameters on a JVM-wide basis, this is no different than what is available today with a single JVM®. It addresses only the application isolation requirement if one were to start a new JVM® running a separate JEE® server for each deployed application. This, however, would defeat the purpose and intent of the JEE® application server.

According to an embodiment of the invention, addressing deficiencies in the prior art may include a mechanism where a J2EE® server is given more control over the memory usage of individual application units, thereby: (i) increasing availability of the server by reducing the likelihood that exhaustion of the JVM® heap will result in the server runtime running out memory; and (ii) increasing the isolation of applications running on the same server by allowing limits to resource consumption.

According to an embodiment of the invention, application memory allocation on a server is manages by receiving an application for processing on the server. A configuration of the application is also received; it includes a defined memory boundary of the application. An application classloader is generated on the server based on the configuration. The classloader tracks memory allocated to the application during application processing. Excess memory usage characteristic of the application is detected. A responsive action may be taken based on the excess memory usage characteristic, including, for example, terminating, restarting, or continuing processing of the application, without affecting other applications arriving at or under processing at the server.

DETAILED DESCRIPTION

Embodiments of the invention make application servers aware of independent memory requirements of application processed by the server. They control memory utilization, manage application isolation as needed, and allow for increased availability of server resources to process additional applications. According to an embodiment of the invention, this can be achieved by configuring the memory boundaries of an application during deployment. A memory-aware custom application classloader may be generated to isolate the application and track its memory usage based on the configuration. Memory-aware classloaders are custom classloaders with the capability to track object allocations in the application. During application processing, at each allocation, the memory-aware classloader may determine if the new object allocation will exceed the limit configured for that application. The server may take appropriate action based on the limit exceeding (or based on such an occurrence being imminent).

Embodiments of the invention will now be described in greater detail in connection with the Figures, below.

Figure 1:
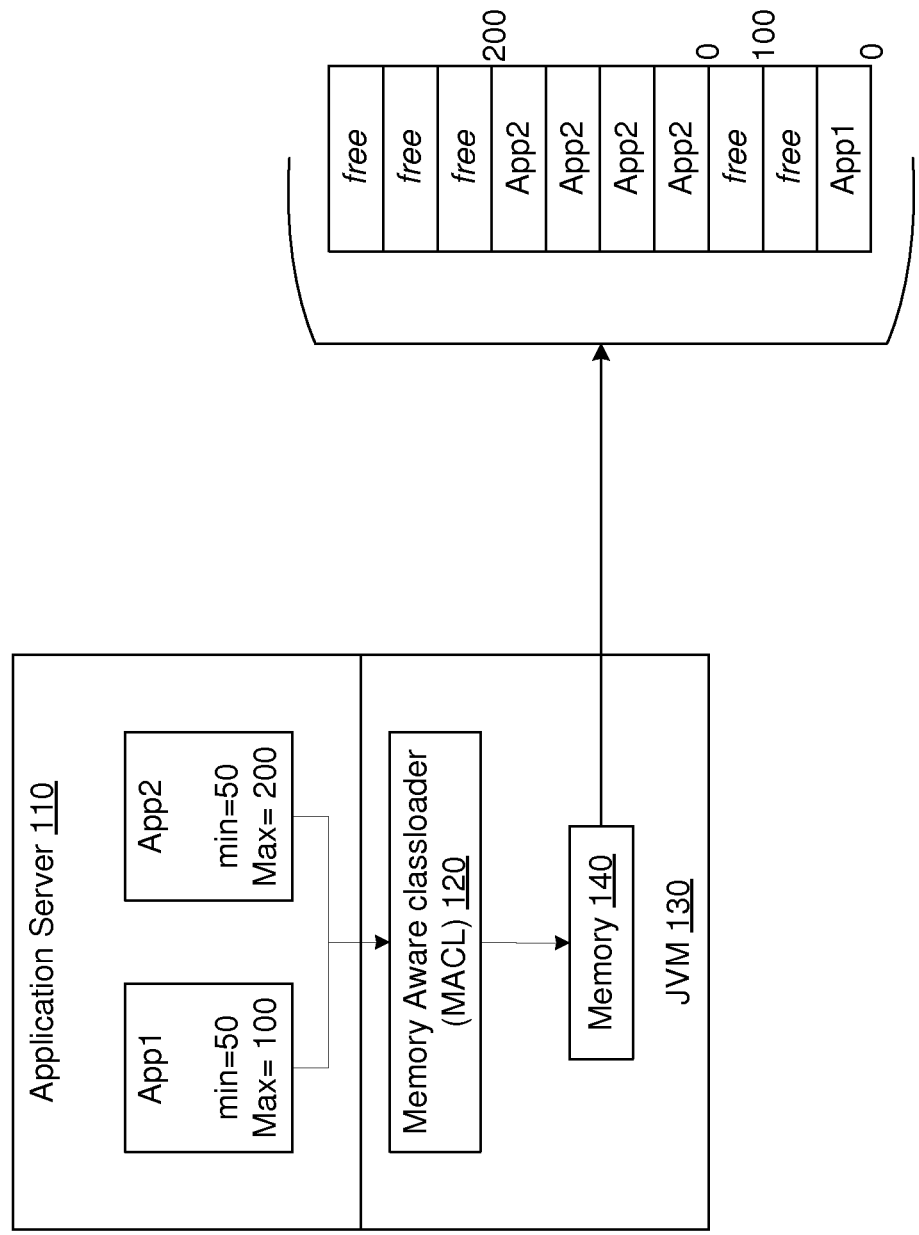
FIG. 1 is a block diagram of an application server, according to an embodiment of the invention.

FIG. 1 is a block diagram of an application server 110, according to an embodiment of the invention. Application server 110 may be a computing device as described below in connection with FIG. 4. According to an embodiment of the invention, application server 110 may be a Java® 2 Platform, Enterprise Edition (J2EE®) server. Application server 110 may be configured to receive (for example, from a user) one or more applications for processing. An application may be any deployable unit of Java EE functionality. For example, it may be a single Java® EE module, or a group of modules packaged as an Enterprise Archive (EAR) file and a Java® EE application deployment descriptor. An application may have memory allocation requirements. In one example, the one or more applications may include App1 and App2. As will be described below in connection with FIG. 3, these applications may have memory allocation requirements, as well as defined memory boundaries.

According to an embodiment, application server 110 may include a Java Virtual Machine (JVM®) 130 component that facilitates processing of the received applications, such as App1 and App2. JVM 130 may be configured to include a memory-aware classloader 120 (MACL 120) component and a memory component 140. A Java® Classloader, in general, is a component of the Java Runtime Environment® that dynamically loads Java classes into JVM 130. A MACL 120 may be a classloader, or a set of classloaders, configured to manage memory allocation requirements and memory boundaries by including, for example, a tracker component. In an embodiment, the tracker component of a MACL 120 (or a classloader that is part of a MACL 120) may be implemented using memory aware classloaders. Other tools that may be used include, for example, monitoring agents, profiles, coverage analyzers, and event loggers.

Memory component 140 represents memory allocation as managed by MACL 120. Memory component 140 is included for illustrative purposes, and includes a table of available memory blocks and their usage by App1 and App2. For example, in the depicted example, App1 is allocated a minimum memory of 50 MB, a maximum memory of 100 MB, and uses 50 MB of memory; and App2 is allocated a minimum of 50 MB, a maximum memory of 200 MB, and uses 200 MB of memory. Memory component 140 includes, in this example, 150 MB of free memory not in use by App1, App2, or any other application.

Figure 2:
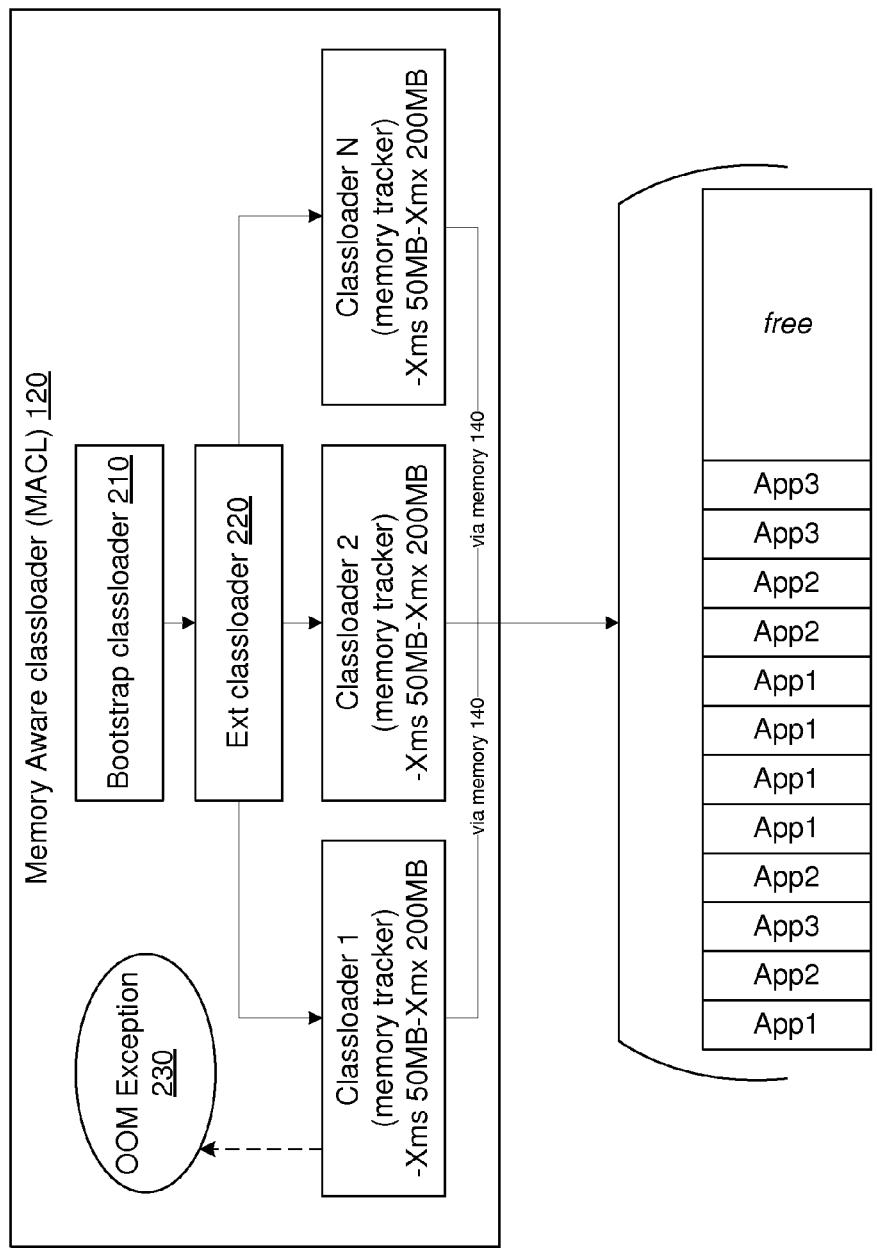
FIG. 2 is a block diagram of a component of the application server of FIG. 1, according to an embodiment of the invention.

FIG. 2 is a block diagram depicting additional details of the MACL 120 component of application server 110 of FIG. 1, according to an embodiment of the invention. MACL 120 includes a bootstrap classloader 210 (this classloader may load, for example, runtime classes, internationalization classes, and others), an extension classloader 220 (this classloader may load, for example, classes in JAR files in a lib/ext director of the Java Runtime Environment (JRE)m ab dub system-wide, platform-specific extension directory), and classloaders 1-N (these classloaders may load, for example, classes in corresponding received applications 1-N), an out of memory exception (OOM) module 230 (this component can be used by classloaders 1-N or other components, to throw an OOM exception), and an illustrative distribution of three applications in memory component 140: App1, App2, and App3.

Each application under processing by application server 110 may have a custom classloader that includes a memory tracker component that defined its minimum and maximum memory boundary (or allocation) and tracks its memory usage. In the illustrative example of FIG. 2, each memory block represents 50 MB of data. App1 has requested use of five memory blocks totaling 250 MB of memory, which is 50 MB over its defined memory boundary.

In the prior art, such a scenario may result in App1 requesting memory blocks without a limit and thus limiting application server's 110 ability to process other applications properly. As will be discussed in connection with method 300 and FIG. 3, below, embodiments of the invention prevent memory requirements of one or more specific applications from disrupting application server's 110 optimal operations and processing of other applications.

Figure 3:
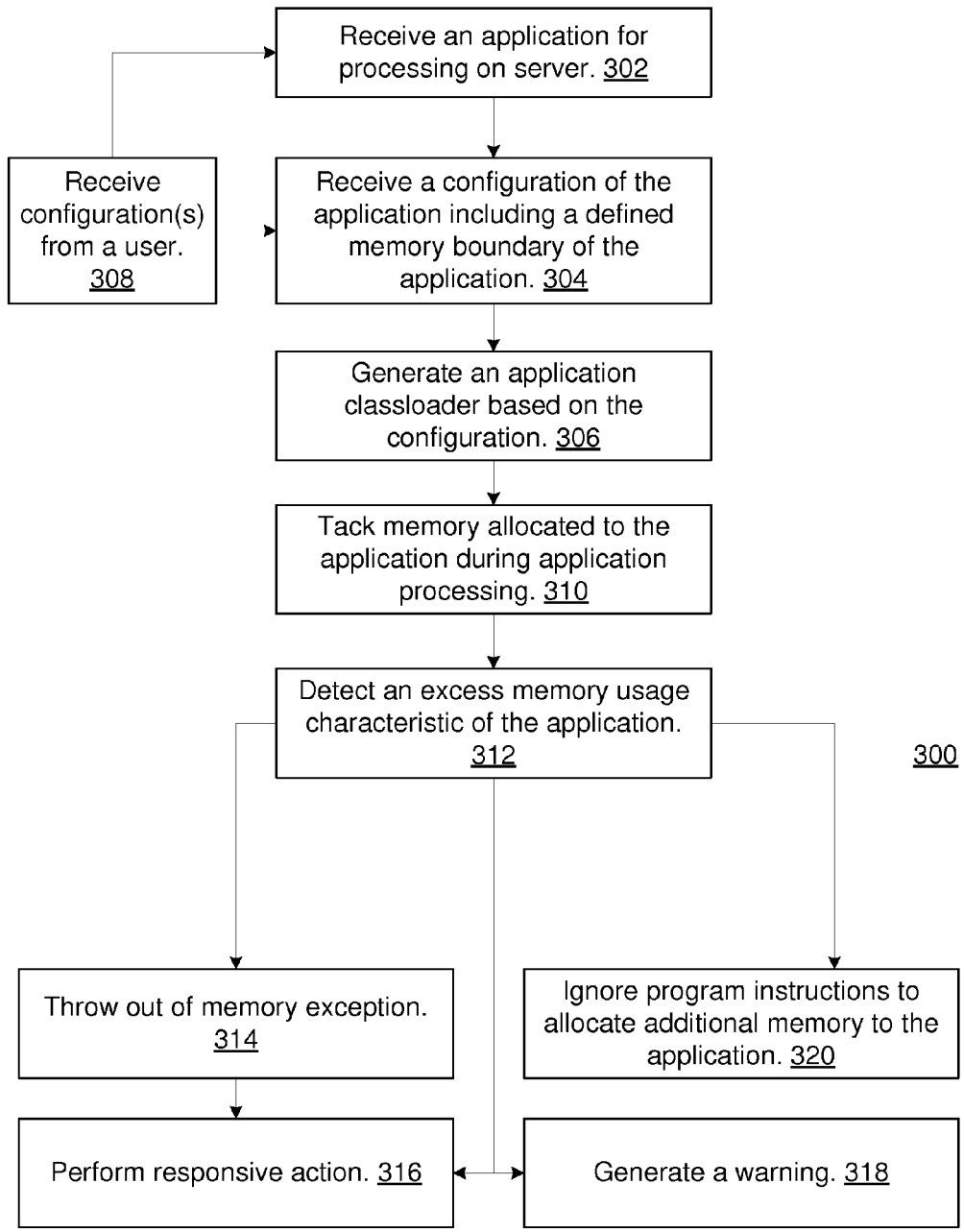
FIG. 3 is a flowchart of a method to manage application memory allocation on the application server of FIG. 1, according to an embodiment of the invention.

FIG. 3 is a flowchart of a method 300 to manage application memory allocation on the application server of FIG. 1, according to an embodiment of the invention, and is described in greater detail below in connection with FIGS. 1 and 2.

Referring now to FIGS. 1-3, at step 302 of method 300, application server 110 may receive one or more applications for processing. The received one or more applications may be, for example, App1 and App2 described in FIG. 1, as well as App3 described in connection with FIG. 2. Application server 110 may receive these applications from one or more users (at step 308), who may submit applications from, for example, a graphical user interface (GUI) application (for example, through a web-based portal), a command prompt, or other input source. Each of the one or more users may be a method, process, or system, or a person interacting with them.

At step 304, application server 110 may receive a configuration of the one or more applications, including a defined memory boundary of the application. In an aspect of the invention, receiving the configuration may be from a user (a method, process, or system, or a person interacting with them), at step 308. In an embodiment, receiving the configuration(s) may be at the time of application deployment via an application management component of application server 110. The user may, for example, enter minimum and/or maximum memory boundaries for a given application.

In an embodiment, the defined memory boundary may include a defined heap size. The heap size definition may include one or more of an absolute value (for example, 100 MB), a threshold value (for example, at least 50 MB), a percentage value (for example, 5%), and a configurable default value (for example, 200 MB). Configurable values may be modified by users (including methods, processes, and systems, and persons interacting with them).

At step 306, for any given application, application server 110 may generate, via JVM 130, a MACL 120 (or a subclassloader). Each MACL 120 possesses information about memory requirements and memory boundaries of its corresponding application, and can throw an OOM exception using an OOM module 230 when processing of its corresponding application results in a memory allocation request that exceeds the application's defined maximum memory boundary. Accordingly, a given MACL 120 may throw an OOM exception even when application server 110 has not exceeded its memory resources. In effect, this functionality isolates memory requirements of each application to a predictable size. Therefore, application server 110 no longer risks low performance or inoperability due to unexpected memory usage of applications under processing.

According to an embodiment, application server 110 may create a memory aware custom classloader for a given application or set of applications as in Table 1, below.

TABLE 1

ClassLoader appOneLoader = new CustomAppClassLoader( );
appOneLoader.setMemoryBoundary("AppOne", "50 Mb", "100 Mb");
ClassLoader appTwoLoader = new CustomAppClassLoader( );
appTwoLoader.setMemoryBoundary("AppTwo", "50 Mb", "200 Mb")

The illustrative code in TABLE 1 creates a custom classloader for each of App1 and App2.

The classloader created at step 306 is memory aware; it registers itself with the JVM® for heap change notifications. The JVM® sends a notification to the classloader upon heap changes from objects under that classloader hierarchy. The classloader tracks the heap size allocated/de-allocated for the corresponding application, with the help of these notifications. As will be discussed below, the classloader throws an OOM exception when the tracked heap size exceeds a configured limit.

At step 310 of method 300, application server 110 tracks memory allocated to applications during processing using corresponding custom classloaders (for example, classloader 1-N) and detects excess memory usage characteristics of the application. For example, as application server 110 processes App1, App1 may attempt to instantiate new objects requiring memory allocation. App1's requested memory allocation may, at some point, exceed its defined memory boundary. The tracker component of classloader 1, which is App1's own memory-aware customer classloader, and maintains a record of memory blocks already in use by App1.

According to an illustrative example, functions of method 300 at steps 306 and 310 may be implemented using the pseudo code described in TABLE 2, below.

TABLE 2

```
//App1 may instantiate an App1-specific object, App1Object
    Object app1Obj = new App1Object( );
//The Application Management component of the J2EE Container
creates a MemoryAwareClassLoader for the Application with the
configured memoryLimit
// MemoryAwareClassLoader initialized
    ClassLoader memAwareCL = new
MemoryAwareClassLoader("App1", memoryLimit);
//The MemoryAwareClassLoader registers itself with the JVM
    JVM.register(memAwareCL);
//MemoryAwareClassLoader implements an onHeapChange( ) listener
method to track the HeapChangeEvent notifications
from JVM for allocate/reallocate/release actions
    memAwareCL.onHeapChange(HeapChangeEvent);
//The Application Management component of the J2EE Container uses the
MemoryAwareClassLoader to load the application class
    Class App1ObjectClass = loadClass("App1Object", memAwareCL);
//The Application Management component of the J2EE Container
creates a new instance of the application object
    Object app1Obj = App1ObjectClass.newInstance( );
//The Application Management component of the J2EE Container
maps the MemoryAwareClassLoader with the instantiated object whose
class was loaded using MemoryAwareClassLoader
    (Object) app1Obj.refCL=memAwareCL;
    java.lang.Object{
    ...
    ClassLoader refCL;
    }
//For any new objects (say System classes) instantiated from
within App1Object, the JVM sets its
referenceClassloader as that of App1Object
    App1Object {
    List list = new ArrayList( ); // JVM ===>
(Object)list.referenceClassloader = App1Object.referenceClassloader;
    Map map = new HashMap( ); // JVM ===>
(Object)map.referenceClassloader = App1Object.referenceClassloader;
    }
//For any object, when there is a heap change (i.e., allocate/reallocate/
release), the JVM notifies the MemoryAwareClassLoader if the reference
classloader of the object is registered with the JVM
    if(registeredWithJVM( (Object)list.refCL) ){
        list.refCL.heapChangeEvent(HeapChangeEvent)
    }
//The MemoryAwareClassLoader processes the HeapChangeEvent
to keep track of the heapConsumed by the application associated
with the MemoryAwareClassLoader
//If the currentMemory of MemoryAwareClassLoader exceeds the
memoryLimit, an OutOfMemory is thrown, and configured actions
for the application are performed
```

At step 312 of method 300, application server 110 may detect an excess memory usage characteristic via, for example, the tracker component of one or more classloaders 1-N. For example, the tracker component of classloader 1 determines whether allocating any additional memory requested by App1 in addition to prior allocations would exceed App1's defined memory boundary. If so, in other steps of method 300, classloader 1 may perform an appropriate action. If not, classloader 1 permits App1's requested memory allocation, and a memory block at the requested size may be allocated to App1.

In one embodiment, at step 314 of method 300, classloader 1 (or any other classloader having detected an excess memory usage characteristic at step 312) may throw an OOM exception using, for example, the OOM module 230. Throwing the exception does not directly affect other applications. As will be described below, classloader 1 may cause application server 110 to perform one or more responsive actions that include terminating, restarting, or continuing processing of App1. However, none of these cases, by itself, requires a corresponding termination, restarting, or continuation of processing of any other application arriving at or under processing by application server 110.

In an embodiment, at step 316 of method 300, server application may perform a responsive action in response to detecting an excess memory usage characteristic at step 312, and/or in response to an OOM exception thrown at step 314. The responsive action may include, without limitation, any one of terminating, restarting, or continuing processing of the corresponding application. As described above, however, none of these cases, by itself, requires a corresponding termination, restarting, or continuation of processing of any other application arriving at or under processing by application server 110.

In an embodiment, at step 318, application server may generate a warning to a user or to an administrator (each of which may be a method, process, or system, or a person interacting with them) indicating that an excess memory usage characteristic has been detected, an OOM is thrown, and/or a responsive action is taken.

In an embodiment, at step 320 of method 300, a customer classloader, such as classloader 1, may ignore program instructions in a corresponding program, such as App1, to allocate additional memory to that application, and application server 110 may continue processing of App1 without any additional memory allocations.

In a related embodiment, the tracking function of step 310, the detecting function of step 312, the exception throwing function of step 314, the generating a warning function of step 318, and other functions of method 300 may be performed preemptively, prior to application server 110 accepting an application for processing. These functions may also be performed at any other time, including dynamically.

Figure 4:
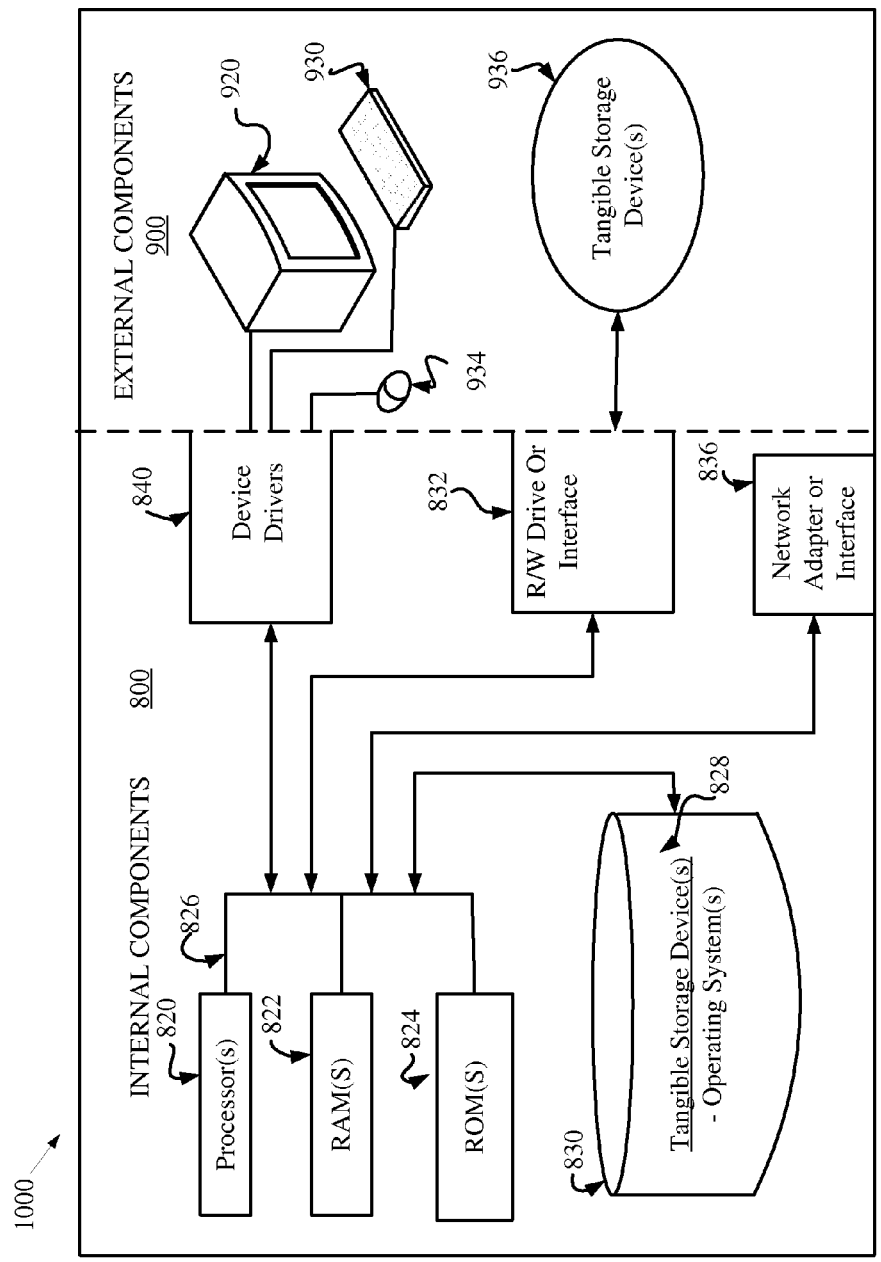
FIG. 4 is a block diagram depicting a computer system for implementing functions of the disclosed invention, according to an embodiment of the disclosure.

Referring now to FIG. 4, a computing device 1000 (e.g., application server 110 in FIG. 1) may include respective sets of internal components 800 and external components 900. Each of the sets of internal components 800 includes one or more processors 820; one or more computer-readable RAMs 822; one or more computer-readable ROMs 824 on one or more buses 826; one or more operating systems 828; one or more software applications (e.g., device driver modules) executing the program x38; and one or more computer-readable tangible storage devices 830. The one or more operating systems 828 and device driver modules are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a thin provisioning storage device, CD-ROM, DVD, SSD, memory stick, magnetic tape, magnetic disk, optical disk or semiconductor storage device. The R/W drive or interface 832 may be used to load the device driver 840 firmware, software, or microcode to tangible storage device 936 to facilitate communication with components of computing device 1000.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 1000, can be downloaded to computing device 1000 from an external computer (e.g., server) via a network (for example, the Internet, a local area network or wide area network) and respective network adapters or interfaces 836. From the network adapters (or switch port adapters) or interfaces 836 and operating system 828 associated with computing device 1000 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Figure 5:
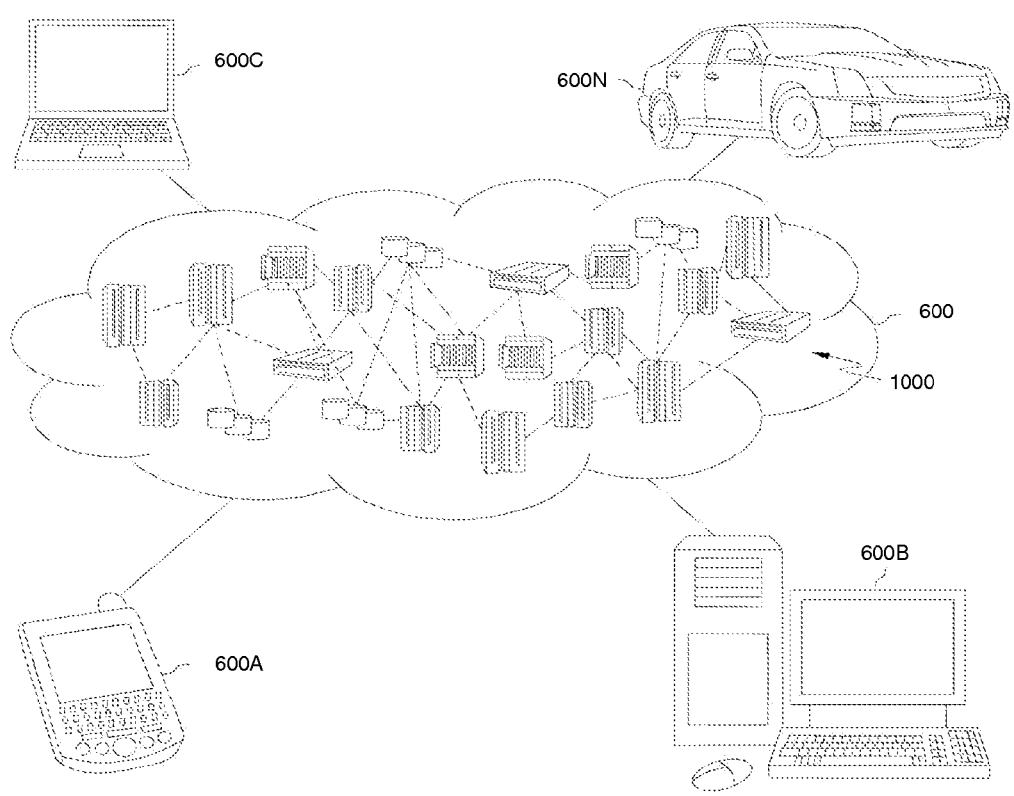
FIG. 5 is a block diagram depicting a cloud computing environment, according to an embodiment of the disclosure.

Referring now to FIG. 5, an illustrative cloud computing environment 600 is depicted. As shown, the cloud computing environment 600 comprises one or more cloud computing nodes, each of which may be a system 1000 with which local computing devices used by cloud consumers, such as, for example, a personal digital assistant (PDA) or a cellular telephone 600A, a desktop computer 600B, a laptop computer 600C, and/or an automobile computer system 600N, may communicate. The nodes 1000 may communicate with one another. They may be grouped (not shown) physically or virtually, in one or more networks, such as Private, Community, Public, or Hybrid clouds as described hereinabove, or a combination thereof. This allows the cloud computing environment 600 to offer infrastructure, platforms and/or software as services for which a cloud consumer does not need to maintain resources on a local computing device. It is understood that the types of computing devices 600A-N shown in FIG. 6 are intended to be illustrative only and that the computing nodes 1000 and the cloud computing environment 600 can communicate with any type of computerized device over any type of network and/or network addressable connection (e.g., using a web browser).

Figure 6:
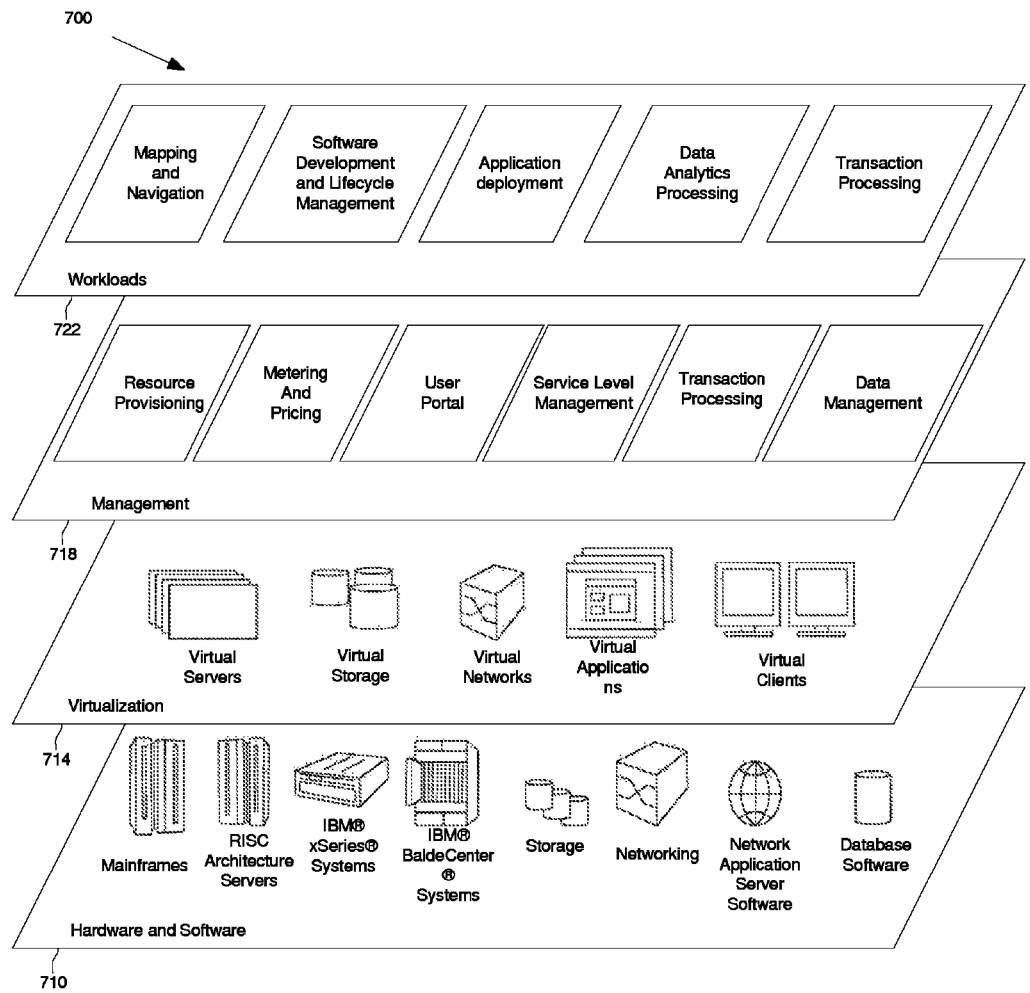
FIG. 6 is a block diagram depicting functional work layers in the cloud computing environment of FIG. 6, according to an embodiment of the disclosure.

Referring now to FIG. 6, a set of functional abstraction layers 700 provided by the cloud computing environment 700 (FIG. 5) is shown. It should be understood in advance that the components, layers, and functions shown in FIG. 7 are intended to be illustrative only and embodiments of the invention are not limited thereto. As depicted, the following layers and corresponding functions are provided.

The hardware and software layer 710 includes hardware and software components.

Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software.

(IBM, zSeries, pSeries, xSeries, BladeCenter, WebSphere, and DB2 are trademarks of International Business Machines Corporation registered in many jurisdictions worldwide).

The virtualization layer 714 provides an abstraction layer from which the following examples of virtual entities may be provided: virtual servers; virtual storage; virtual networks, including virtual private networks; virtual applications and operating systems; and virtual clients.

In one example, the management layer 718 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

The workloads layer 722 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a tool for managing application deployment on a server, such as that provided for by embodiments of the present disclosure described in FIGS. 1-4.

While the present invention is particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system for managing application memory allocation on a server, comprising:
   a computer device having a processor and a tangible storage device; and
   a program embodied on the storage device for execution by the processor, the program having a plurality of program instructions to:
   receive a plurality of applications including a first application for processing on the server, the server having memory resources for application processing;
   receive a configuration of the first application, the configuration including a defined memory boundary of the first application;
   tracking memory allocated to the first application during application processing; and
   detect an excess memory usage characteristic of the first application,
   wherein the excess memory usage characteristic corresponds to the first application performing at least one of requesting and using memory equal to or in excess of the application's defined memory boundary, and
   wherein the instructions to detect comprise instructions to determine that accommodating the first application's request or continuing processing the first application based on its memory use results in using less than all of the memory resources of the server.

2. The system of claim 1, further comprising:
   throwing an out of memory exception based on detecting the excess memory usage characteristic.

3. The system of claim 1, further comprising:
   performing a responsive action with respect to the first application based on detecting the excess memory usage characteristic, the responsive action comprising one of terminating, restarting, or continuing the application.

4. The system of claim 1, wherein the server comprises a memory-aware runtime environment for running object-oriented applications.

5. The system of claim 1, wherein receiving the configuration of the first application further comprises:
   receiving the configuration from a user, the configuration including a defined memory boundary of the application.

6. The system of claim 1, further comprising:
   ignoring, based on the out of memory exception, program instructions to allocate additional memory to the first application.

7. A computer program product for managing application memory allocation on a server, comprising a tangible storage device having program code embodied therewith, the program code executable by a processor of a computer to perform a method, the method comprising:
   receiving, by the processor, a plurality of applications include a first application for processing on the server, the server having memory resources for application processing;
   receiving, by the processor, a configuration of the first application, the configuration including a defined memory boundary of the first application;
   tracking memory allocated to the first application during application processing; and
   detecting, by the processor, an excess memory usage characteristic of the first application,
   wherein the excess memory usage characteristic corresponds to the first application performing at least one of requesting and using memory equal to or in excess of the application's defined memory boundary, and
   wherein the detecting comprises determining that accommodating the first application's request or continuing processing the first application based on its memory use results in using less than all of the memory resources of the server.

8. The computer program product of claim 7, further comprising:
   throwing an out of memory exception, by the processor, based on detecting the excess memory usage characteristic.

9. The computer program product of claim 7, further comprising:
   performing a responsive action, by the processor, with respect to the first application based on detecting the excess memory usage characteristic, the responsive action comprising one of terminating, restarting, or continuing the application.

10. The computer program product of claim 7, wherein the server comprises a memory-aware runtime environment for running object-oriented applications.

11. The computer program product of claim 7, further comprising:
    ignoring, based on the out of memory exception, program instructions to allocate additional memory to the first application.

* * * * *